June 2, 1936.    T. C. DELAVAL-CROW    2,042,882
ANTIFRICTION BEARING AND MOUNTING
Filed Nov. 27, 1934

INVENTOR:
THOMAS C. DELAVAL-CROW,
BY
HIS ATTORNEY.

Patented June 2, 1936

2,042,882

UNITED STATES PATENT OFFICE 2,042,882

ANTIFRICTION BEARING AND MOUNTING

Thomas C. Delaval-Crow, Bristol, Conn., assignor to General Motors Corporation, Detroit, Mich., a corporation of Delaware Application November 27, 1934, Serial No. 755,016

12 Claims. (Cl. 308—189)

This invention relates to antifriction bearings and mountings and comprises all of the features of novelty herein disclosed. An object of the invention is to provide an improved bearing of the double row type which is given a predetermined internal load at the time of mounting. Another object is to provide improved means for preloading a bearing while at the same time insuring that such preload will not be exceeded. Another object is to provide a simple, cheap and reliable bearing mounting for a steering arm or the like.

Figure 1:
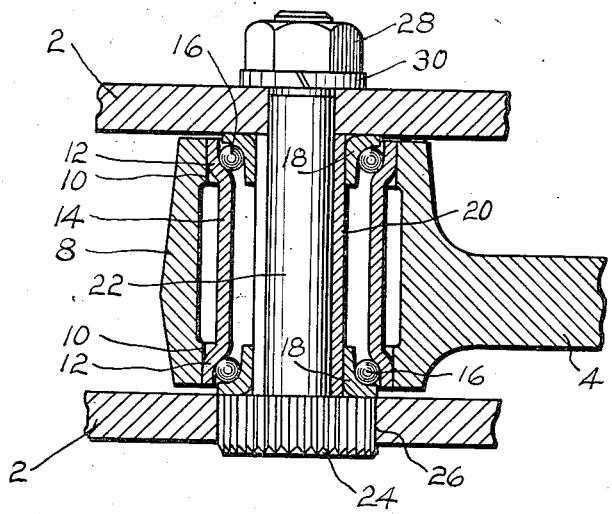
Figure 2:
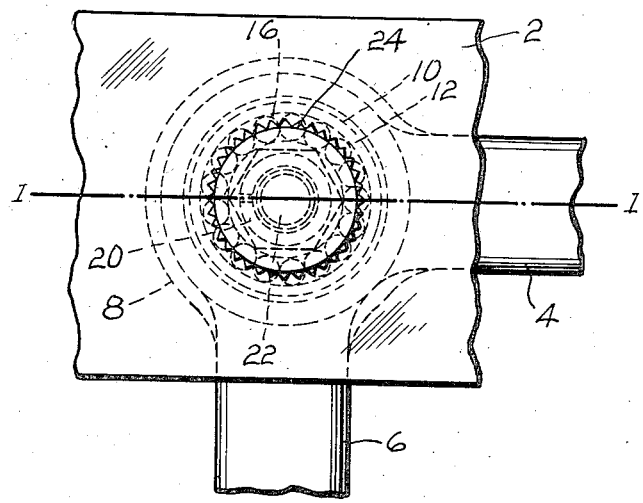

To these ends and also to improve generally upon devices of this character, the invention consists in the various matters hereinafter described and claimed. In its broader aspects, the invention is not necessarily limited to the specific construction selected for illustrative purposes in the accompanying drawing in which Fig. 1 is a sectional view on the line 1—1 of Fig. 2 and Fig. 2 is a plan view of a portion of the intermediate steering arm and associated parts of a motor vehicle.

The numeral 2 represents a pair of horizontal flanges projecting from the web of a channel iron frame member or the like. A steering lever having arms 4 and 6 joined to a housing or hub member 8 is pivotally mounted between the flanges 2 by the improved bearing. The hub member 8 is provided with seats or bores 10 which are reamed out in axial alignment. Seated firmly in the seats 10, as by a press fit, are the end portions 12 of an outer race ring or sleeve 14.

The race ring 14 is conveniently and cheaply formed from a tube or sleeve which has its end portions 12 expanded, the whole being hardened, as by carburizing. Angular contact raceways in the expanded end portions engage rolling elements 16 herein shown as balls. Two inner race rings 18 have co-operating raceways for the balls and are preferably swedged by dies into their generally angular form. The raceways on the ring 14 face away from each other at a fixed distance apart and the raceways on the rings 18 face towards each other. The rings 18 are hardened, as by carburizing, and are mounted on a split sleeve 20 which is cheaply produced from a flat strip rolled up. The split sleeve tends to expand and frictionally engages and retains the rings 18 and the entire bearing in assembled relation as a unit although the rings can be forced along the sleeve by axial pressure.

A bolt 22 is passed through the sleeve 20, the head 24 of the bolt being serrated or knurled to prevent its turning in an opening 26 of the lower flange 2. A nut 28 is threaded on the upper end of the bolt and clamps down against a lock washer 30 engaging the upper flange 2. When preloading the bearings, the inner race rings 18 are forced towards one another with the desired pressure and the ends of the sleeve 20 made exactly flush with the outer surfaces or ends of the rings 18, as by milling off surplus material at one end of the sleeve. Then when the bearing is mounted as above described, the sleeve is clamped between the head of the bolt and the upper flange 2. Thus the sleeve provides a distance piece or spacer which insures the proper amount of preload and also provides a positive stop or abutment which prevents that desired preload from being exceeded. Also, since the knurled head of the bolt can be drawn into the opening 26 of the comparatively soft material of the flanges 2, in setting up the nut 28, the flanges 2 are not bent or pulled out of their original position.

I claim:

1. In a device of the character described, a member having a pair of fixedly spaced angular contact raceways, a pair of race rings having angular contact raceways, rolling elements engaging the raceways, a sleeve engaging the pair of race rings and furnishing a sliding support therefor, the sleeve being smooth and unobstructed at both ends of each race ring to provide for relative sliding movement between the race rings, the sleeve being of a length to have its ends lie flush with the ends of the pair of race rings when the latter are forced towards one another with a predetermined pressure, and means engaging such flush ends of the sleeve and the race rings to hold the bearing elements under a predetermined initial load; substantially as described.

2. In a device of the character described, a pair of relatively rotatable members, one having associated therewith a pair of angular contact raceways spaced apart a fixed distance, the other having associated therewith a pair of race rings with angular contact raceways, rolling elements in two rows engaging the raceways, a split sleeve slidably supporting the race rings and acting to frictionally hold the race rings assembled, and the sleeve being of a length to lie flush with the ends of the race rings when the latter are forced against the rolling elements with a predetermined pressure; substantially as described.

3. In a device of the character described, a member having a pair of fixedly spaced angular contact raceways, a pair of race rings having angular contact raceways, rolling elements engaging the raceways, a sleeve engaging the pair of race rings and furnishing a smooth, sliding support therefor, clamping means engaging the ends of the pair of race rings to cause relative sliding approach of the race rings on the sleeve, and the sleeve being of a length to engage the clamping means and prevent further approach of the race rings after the latter engage the rolling elements with a predetermined pressure; substantially as described.

4. In a device of the character described, a member having a pair of fixedly spaced angular contact raceways, a pair of race rings having angular contact raceways, rolling elements engaging the raceways, clamping means engaging the ends of the race rings for causing approach of the race rings to preload the rolling elements, and abutment means furnishing sliding support for at least one of the race rings and constructed and arranged to prevent further approach of the race rings after the latter engage the rolling elements with a predetermined pressure; substantially as described.

5. In a device of the character described, a pair of relatively rotatable members, one having associated therewith a pair of angular contact raceways spaced apart a fixed distance, the other having associated therewith a pair of relatively adjustable angular contact raceways, rolling elements in two rows engaging the raceways, means for causing relative axial movement between said adjustable raceways to apply a predetermined load to the rolling elements, and abutment means having sliding engagement with at least one of the relatively adjustable raceways, said means limiting said adjustment and preventing said predetermined load from being exceeded; substantially as described.

6. In a device of the character described, a relatively rotatable housing and a shaft, one of said members having associated therewith a pair of angular contact raceways facing away from each other and spaced apart a fixed distance, and the other member having associated therewith a pair of relatively adjustable angular contact raceways facing towards one another, rolling elements in two rows engaging the raceways, means for causing relative movement of approach between said adjustable raceways to put initial load on the rolling elements, and an abutment sleeve for positively stopping said movement of approach when the rolling elements are loaded to a predetermined degree; substantially as described.

7. In a device of the character described, an outer race ring having a pair of raceways facing away from one another, a pair of inner race rings spaced apart and having raceways facing towards one another, rolling elements engaging the raceways, and an expansible sleeve extending through the inner race rings from the outer end of one to the outer end of the other, the sleeve being inherently expansible to frictionally hold the inner race rings assembled and furnishing a sliding support therefor; substantially as described.

8. In a device of the character described, an outer race ring having a pair of fixedly spaced raceways facing away from one another, a pair of inner race rings having raceways facing towards one another, rolling elements engaging the raceways, a sleeve slidably supporting the inner race rings and extending through the inner race rings from the outer end of one to the outer end of the other, the race rings having a free space between them to provide for relative sliding movement of approach, and means independent of the sleeve and engaging the ends of the sleeve and the ends of the inner race rings for holding the ends of the inner race rings flush with the ends of the sleeve and the sleeve being expansible to frictionally hold the rings; substantially as described.

9. In a device of the character described, an outer race ring having a pair of raceways, a pair of inner race rings having raceways, rolling elements engaging the raceways, a sleeve slidably supporting the inner race rings and extending through the inner race rings from the outer end of one to the outer end of the other, the sleeve being split lengthwise and inherently expansible to frictionally hold the inner race rings assembled, a member abutting against one end of the sleeve and the end of one of the inner race rings, a member abutting against the other end of the sleeve and the end of the other race ring, and means for holding said members from separation; substantially as described.

10. In a device of the character described, an outer race ring having a pair of raceways, a pair of inner race rings having raceways, rolling elements engaging the raceways, a sleeve extending through the inner race rings from the outer end of one to the outer end of the other, a headed bolt extending through the sleeve and having its head engaging the end of the sleeve and the end of one of the inner race rings, and means held on the other end of the bolt for engaging the other end of the sleeve and the end of the other inner race ring; substantially as described.

11. In a device of the character described, an outer race ring having a pair of raceways, a pair of inner race rings having raceways, rolling elements engaging the raceways, a sleeve extending through the inner race rings, a pair of supporting members having openings, one of said supporting members engaging one end of the sleeve and one of the inner race rings, a headed bolt having its head in one of the openings and engaging the other end of the sleeve and the other inner race ring, and a nut on the bolt and engaging said one supporting member; substantially as described.

12. In a device of the character described, an arm having a hub portion, an outer race ring seated in the hub portion of the arm and having raceways, a pair of inner race rings having raceways, a sleeve extending through the inner race rings, a supporting member, a bolt extending through the sleeve and the supporting member, and a nut on the bolt for holding the sleeve and the inner race rings between the head of the bolt and the supporting member; substantially as described.

THOMAS C. DELAVAL-CROW.